(12) United States Patent
Bradford

(10) Patent No.: US 7,163,003 B2
(45) Date of Patent: Jan. 16, 2007

(54) FUEL SYSTEM

(75) Inventor: Peter Francis Bradford, Sudbury (GB)

(73) Assignee: Delphi Technologies, Inc., Troy, MI (US)

( * ) Notice: Subject to any disclaimer, the term of this patent is extended or adjusted under 35 U.S.C. 154(b) by 122 days.

(21) Appl. No.: 10/507,706

(22) PCT Filed: Mar. 13, 2003

(86) PCT No.: PCT/GB03/01054

§ 371 (c)(1),
(2), (4) Date: Mar. 21, 2005

(87) PCT Pub. No.: WO03/078821

PCT Pub. Date: Sep. 25, 2003

(65) Prior Publication Data
US 2005/0155585 A1    Jul. 21, 2005

(30) Foreign Application Priority Data
Mar. 14, 2002 (GB) ................... 0205965.7

(51) Int. Cl.
F02M 37/04 (2006.01)
(52) U.S. Cl. ..................... 123/510; 123/514
(58) Field of Classification Search ............... 123/509, 123/510, 511, 514
See application file for complete search history.

(56) References Cited

U.S. PATENT DOCUMENTS

| 5,078,167 | A | * | 1/1992 | Brandt et al. ................ 137/549 |
| 5,433,241 | A | * | 7/1995 | Robinson ................ 137/115.13 |
| 5,636,616 | A |   | 6/1997 | Okane et al. |
| 5,832,902 | A | * | 11/1998 | Davis et al. ................. 123/514 |
| 5,832,903 | A | * | 11/1998 | White et al. ................. 123/514 |
| 6,062,203 | A |   | 5/2000 | Takahashi et al. |
| 6,098,599 | A | * | 8/2000 | Muldoon et al. ........... 123/514 |
| 6,156,201 | A | * | 12/2000 | Ueda et al. ............... 210/416.4 |
| 6,164,267 | A | * | 12/2000 | Okada et al. ................ 123/510 |
| 6,220,227 | B1 | * | 4/2001 | Okada et al. ................ 123/509 |
| 6,253,740 | B1 | * | 7/2001 | Rembold ..................... 123/509 |
| 6,371,088 | B1 | * | 4/2002 | Wheeler ....................... 123/514 |
| 6,553,973 | B1 | * | 4/2003 | Coha et al. .................. 123/509 |
| 7,044,110 | B1 | * | 5/2006 | Geyer .......................... 123/514 |

FOREIGN PATENT DOCUMENTS

DE    19846616    4/2000

(Continued)

Primary Examiner—Thomas Moulis
(74) Attorney, Agent, or Firm—David P. Wood

(57) ABSTRACT

A fuel system for an internal combustion engine comprises a fuel injection apparatus (16) including at least one fuel injector (18), the fuel injection apparatus (16) being arranged to inject fuel at high pressure into an associated combustion space, and a primary supply line (11) through which fuel is supplied from a low pressure reservoir (10) to the fuel injection apparatus (16). The system also includes a return flow line (20) for a return flow of fuel from the fuel injection apparatus (16) to the low pressure reservoir (10), and a filter arrangement (32) including a primary filter (14) arranged within the primary supply line (11) for filtering contaminants in the fuel flow through the primary supply line (11) and a secondary filter (30) arranged within the return flow line (20) for filtering contaminants from the flow through the return flow line (20).

20 Claims, 8 Drawing Sheets

FOREIGN PATENT DOCUMENTS

| | | |
|---|---|---|
| DE | 10030324 | 1/2002 |
| EP | 0814256 | 12/1997 |
| EP | 0878620 | 11/1998 |
| EP | 0916839 | 5/1999 |
| FR | 2786534 | 6/2000 |
| GB | 2292184 | 2/1996 |
| JP | 11351043 | 12/1999 |

* cited by examiner

FUEL SYSTEM

The invention relates to a fuel system for use in an internal combustion engine, particularly of the compression-ignition type. In particular, the invention relates to a fuel system comprising a filter arrangement for filtering particulate contaminants in the flow of fuel through the system. The invention also relates to a filter arrangement for use in such a fuel system.

Figure 1:
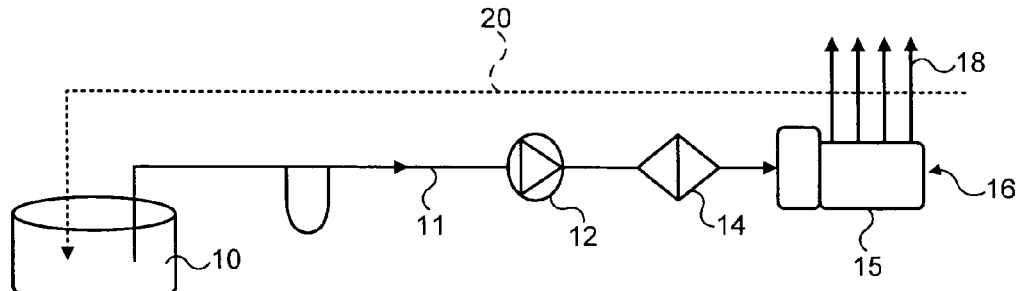

FIG. 1 is a schematic diagram of a conventional type of fuel system for an internal combustion engine in which fuel is supplied from a low pressure reservoir or tank 10 to fuel injection equipment (FIE) 16 through a primary supply line 11. The supply line 11 includes a low pressure pump 12 and a primary filter 14 which filters the flow through the supply line 11 so as to avoid contamination of the FIE 16 by undesirable particles. Such particles may arise, for example, due to internal deterioration debris or service-induced debris. The FIE 16 includes one or more high pressure pumps 15 for delivering fuel at high pressure to a plurality of fuel injectors 18 (four of which are represented in the illustration), each of which delivers fuel to an associated cylinder of the engine (not shown). A back leak or return flow of fuel flows from the fuel injectors 18 through a return flow line 20 to the tank 10. In such systems, fuel from the reservoir 10 is drawn through the supply line 11 on demand, with any excess being accommodated by the low pressure pump 12 free wheeling when supply exceeds demand, and with only a negligible return flow of fuel being returned through the return flow line 20 to the tank 10. The volume of fuel flow through the system is therefore approximately equal to the volume of fuel to be injected into the engine.

Figure 2:
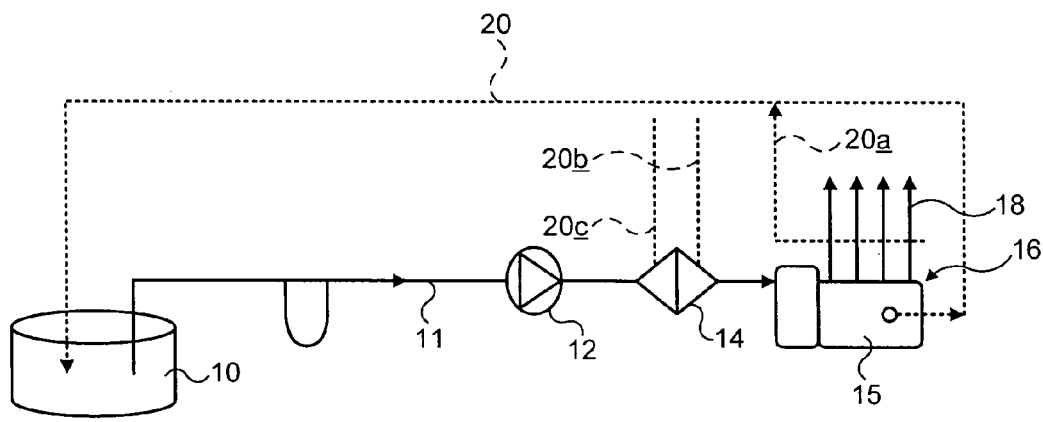

FIG. 2 shows an alternative fuel system to that shown in FIG. 1, in which there is a positive return flow of fuel through the return flow line 20 to the reservoir 10 due to excess fuel being fed back through the return flow line 20 from the high pressure pump 15. The flow through the return flow line 20 consists of a back leak flow 20*a* from the injectors 18 and, in addition, a further return flow of fuel from either the clean side of the primary filter 14 (shown as a dashed line 20*b*) or the dirty side of the primary filter 14 (shown as a dashed line 20*c*). In systems such as that shown in FIG. 2, the return flow volumes are therefore more significant, and it is usual for such return flow volumes to be significantly greater than the injected fuel volumes. By way of example, pumped fuel volume is typically in the range of 1200 ml/min to 1700 ml/min whereas injected fuel volume is typically in the range of 10 ml/min to 50 ml/min, dependent on engine load. Therefore, the returned fuel volume is significantly greater than the injected fuel volume.

Figure 3:
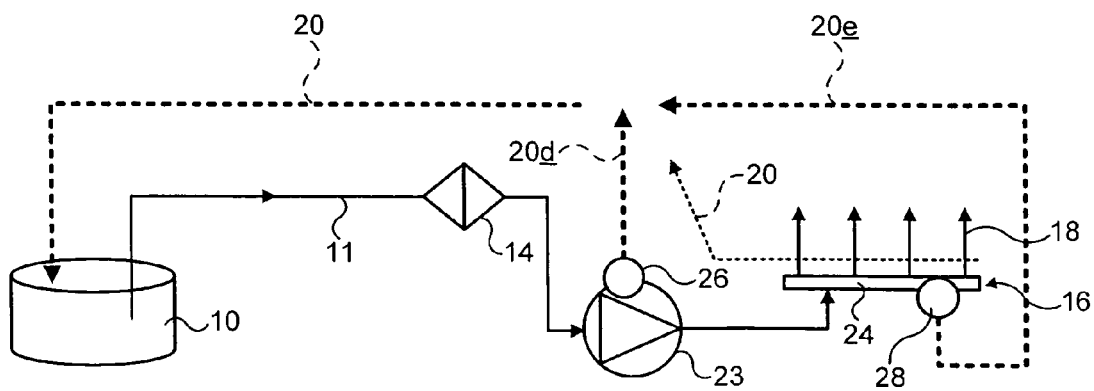

FIG. 3 shows a further alternative known system, in which a flow of fuel from the tank 10 is delivered through the supply line 11 to a high pressure pump 23 for supplying high pressure fuel to a common rail 24. The common rail 24 supplies fuel at high pressure to the injectors 18. It is known to provide the high pressure pump 23 with a pressure regulator 26 from which a flow of fuel 20*d* in excess of the regulated flow is returned to the reservoir 10 through the return flow line 20. Alternatively, or in addition, the common rail 24 may be provided with a pressure regulator 28 from where a flow of fuel 20*e* in excess of the required regulated flow is returned to the reservoir through the return flow line 20. In such systems, a back leak or return flow from the injectors 18 is also returned through the return flow line 20. Again, as in the system in FIG. 2, the fuel flow volumes through the system may be significantly greater than the injected volumes of fuel.

In the positive return flow systems of FIGS. 2 and 3, the increased volumes of recirculated fuel have a detrimental effect on the service life of the primary filter 14. For example, the flow limitations of the primary filter 14 are often exceeded due to the additional choking of the filter with each successive pass through the fuel system. Furthermore, the high recirculation flows through additional pipework may gather residual debris, and abrasive debris in the increased recirculated flow has the potential to scrape additional material from internal surfaces of the pipework High recirculation flows also have the potential to disturb tank contents to a greater extent than is expected from usual vehicle movement The accumulation and agitation of system debris leads to higher levels of presentation at the primary filter, resulting in additional transmission of debris and, hence, greater potential for wear.

It is known to provide filters located in a return flow pipe. For example U.S. Pat. No. 5,636,616 discloses a fuel supply apparatus in which a low-pressure fuel filter is disposed in a fuel-return pipe, said fuel-return pipe being in communication with a fuel pressure regulator located so as to regulate pressure in the fuel supply pipe. Fuel flow in excess of the regulated flow is then returned to the low pressure reservoir through the fuel return pipe and the filter.

It will be appreciated that U.S. Pat. No. 5,636,616 does not demonstrate a positive-return type fuel system and that the fuel supply apparatus is intended for use with a spark-ignition internal combustion engine (petrol engine) as opposed to a compression-ignition internal combustion engine (diesel engine). In U.S. Pat. No. 5,636,616 no provision is made for a return flow from the injectors, nor from the fuel supply pipe, and therefore the volume of fuel pumped from the injectors is substantially equal to the volume of fuel supplied to the injectors by the fuel supply pipe. It will also be noted that in the U.S. Pat. No. 5,636,616 system the fuel pump and associated suction filter, fuel pressure regulator, fuel return pipe and the low pressure fuel filter are all disposed within the fuel reservoir.

Other fuel supply apparatus incorporating fuel filters are known. For example U.S. Pat. No. 6,062,203 discloses a fuel supply apparatus comprising a mounting bracket having a filter installing portion into which a fuel filter is installed. A fuel pump is used to pump fuel through the fuel filter and to the supply line. However, the fuel supply apparatus is not provided with a fuel filter located in the return fuel line to remove debris and contaminants from the return flow of fuel.

It is an object of the present invention to provide a fuel system in which the aforementioned problems are alleviated or avoided. It is a further object of the present invention to provide a, filter arrangement for use in such a fuel system.

According to a first aspect of the present invention, there is provided a fuel system for an internal combustion engine, the fuel system comprising a fuel injection apparatus including at least one fuel injector, the fuel injection apparatus being arranged to inject fuel at high pressure into an associated combustion space, a primary supply line through which fuel is supplied from a low pressure reservoir to the fuel injection apparatus and a return flow line for a return flow of fuel from the fuel injection apparatus to the low pressure reservoir.

The fuel system further comprises a filter arrangement including a primary filter arranged within the primary supply line for filtering contaminants in the fuel flow through the primary supply line and a secondary filter arranged within the return flow line for filtering contaminants from the flow through the return flow line wherein the primary filter and the secondary filter are housed within a common filter housing.

In one embodiment of the invention, the fuel injection apparatus includes a plurality of fuel injectors, the return flow line being arranged such that a return flow of fuel, or a back leak flow, flows from the injectors, through the return flow line to the low pressure reservoir.

In a preferred embodiment of the invention, the fuel system is intended for use with a compression-ignition internal combustion engine (diesel engine) and more preferably with a common rail fuel system of a compression-ignition internal combustion engine.

The fuel system may further comprise a high pressure pump means arranged in the primary supply line to receive filtered fuel from the primary filter and to deliver fuel at high pressure to the injectors, and wherein the return flow line is arranged such that a return flow of fuel flows from the high pressure pump means, through the return flow line to the low pressure reservoir.

The fuel system may take the form of a common rail fuel system, comprising a common rail for receiving fuel at high pressure from the high pressure pump means and delivering fuel to the fuel injector(s). In one embodiment, the high pressure pump means is provided with a pressure regulator from which a return flow of fuel flows through the return flow line to the low pressure reservoir. Alternatively, the common rail may be provided with a pressure regulator from which a return flow of fuel flows through the return flow line to the low pressure reservoir.

Typically the common rail is charged with fuel to a pressure between 1000 and 2000 bar (or higher).

The filter housing may include one or more housing parts secured together to form the common housing for the primary and secondary filter elements.

A cost advantage is provided if the primary, and secondary filters are arranged within a common housing. Furthermore, less accommodation space is required within the engine for the two filter elements.

In one embodiment, the filter arrangement includes a primary filter chamber within which a primary filter member is arranged and a secondary filter chamber within which a secondary filter member is arranged, wherein the primary and secondary filter members are substantially impermeable to particulate contaminants and other debris within the fuel flow through the primary and secondary filter chambers respectively and wherein the primary and secondary filter chambers are substantially sealed from one another.

Typically, the primary and secondary filter members are of tubular form and are arranged coaxially with one another, either in an end-to-end configuration such that one end of the primary filter member faces one end of the secondary filter member, or in a configuration in which one filter member is received, at least in part, within the other filter member. By way of example, the filter members may be pleated paper filter members.

Alternatively, the primary and secondary filter members may be located in a side-by-side configuration in the primary and secondary filter chambers respectively, wherein the primary and secondary filter chambers are adjacent to one another.

For example, the primary filter member may define a central bore and the secondary filter member may be arranged within the central bore of the primary filter member. Alternatively, the secondary filter member defines a central bore and the primary filter member may be arranged within the central bore of the secondary filter member.

Preferably, the filter housing is shaped to define a primary inlet and a primary outlet through which fuel flows into and out of the primary filter chamber respectively, and a secondary inlet and a secondary outlet through which fuel flows into and out of the secondary filter chamber respectively, wherein the primary and secondary inlets and outlets are located at the same end of the filter housing.

The fuel system may also include a diverter flow path through which the return flow of fuel flows, in use, when fuel temperature within the primary filter chamber is less than a predetermined amount, and a diverter valve arrangement for controlling the flow of fuel through the diverter flow path in response to fuel temperature within the primary filter chamber.

The valve arrangement may include a temperature sensitive actuator arrangement for actuating movement of a valve member to selectively open communication between the secondary filter chamber and the diverter flow path in response to fuel temperature within the primary filter chamber, wherein the temperature sensitive actuator arrangement includes, for example, any one of a bimetallic element, a Shape Memory Effect spring, a wax element thermostat or temperature sensitive bellows.

According to a second aspect of the present invention, there is provided a filter arrangement for a fuel system for an internal combustion engine comprising a low pressure reservoir and a fuel injection apparatus. The filter arrangement comprises a filter housing, a primary filter chamber defined by the filter housing and having a filter member arranged therein for filtering a primary fuel flow and a secondary filter chamber defined by the filter housing and having a secondary filter member arranged therein for filtering a secondary fuel flow. The primary and secondary filter chambers are substantially sealed from one another.

Preferred and/or optional features of the first aspect of the invention may be included, alone or in combination, within the second aspect of the invention.

Figure 4:
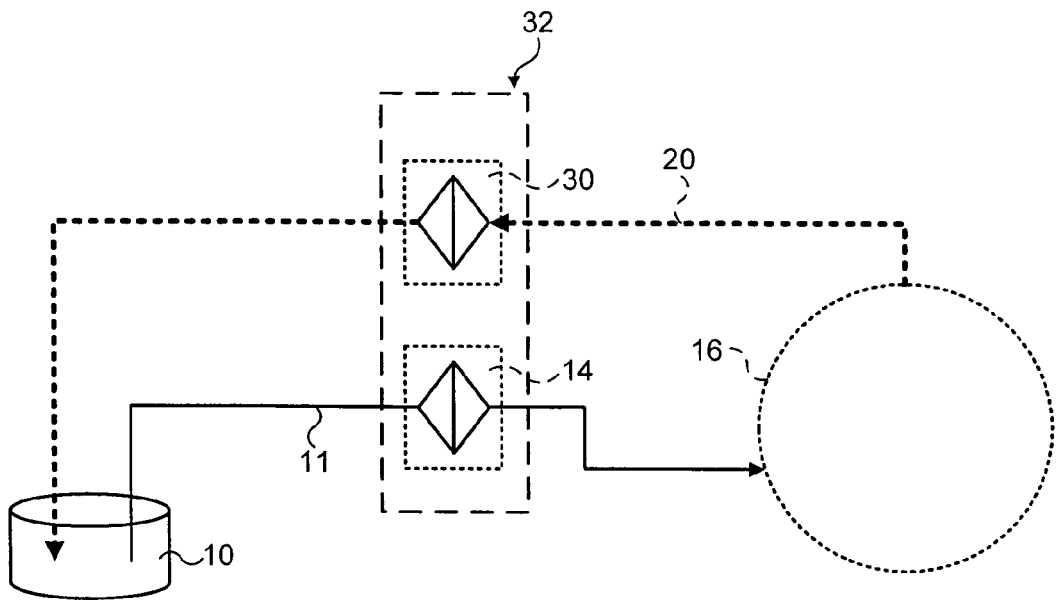
Figure 5:
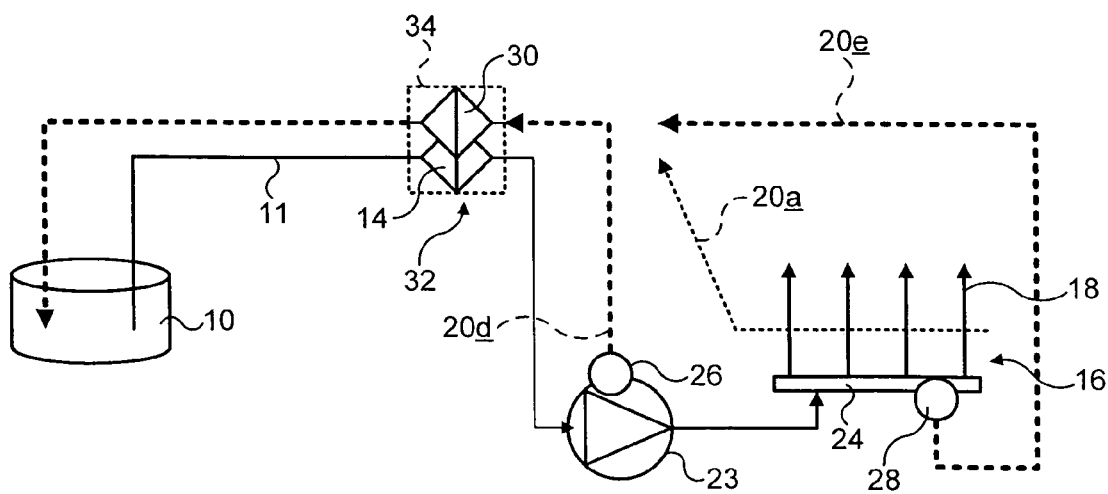
Figure 6:
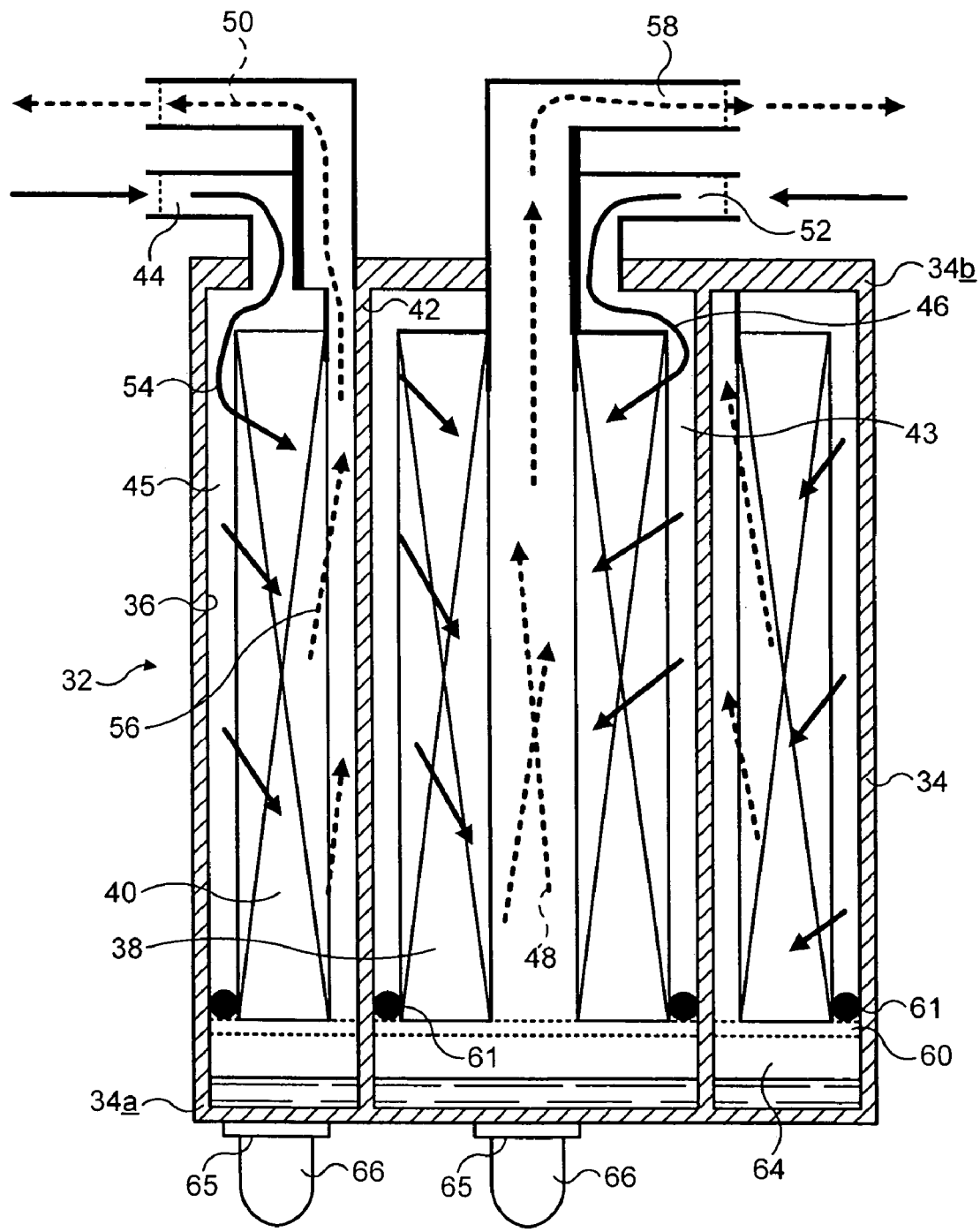
Figure 7:
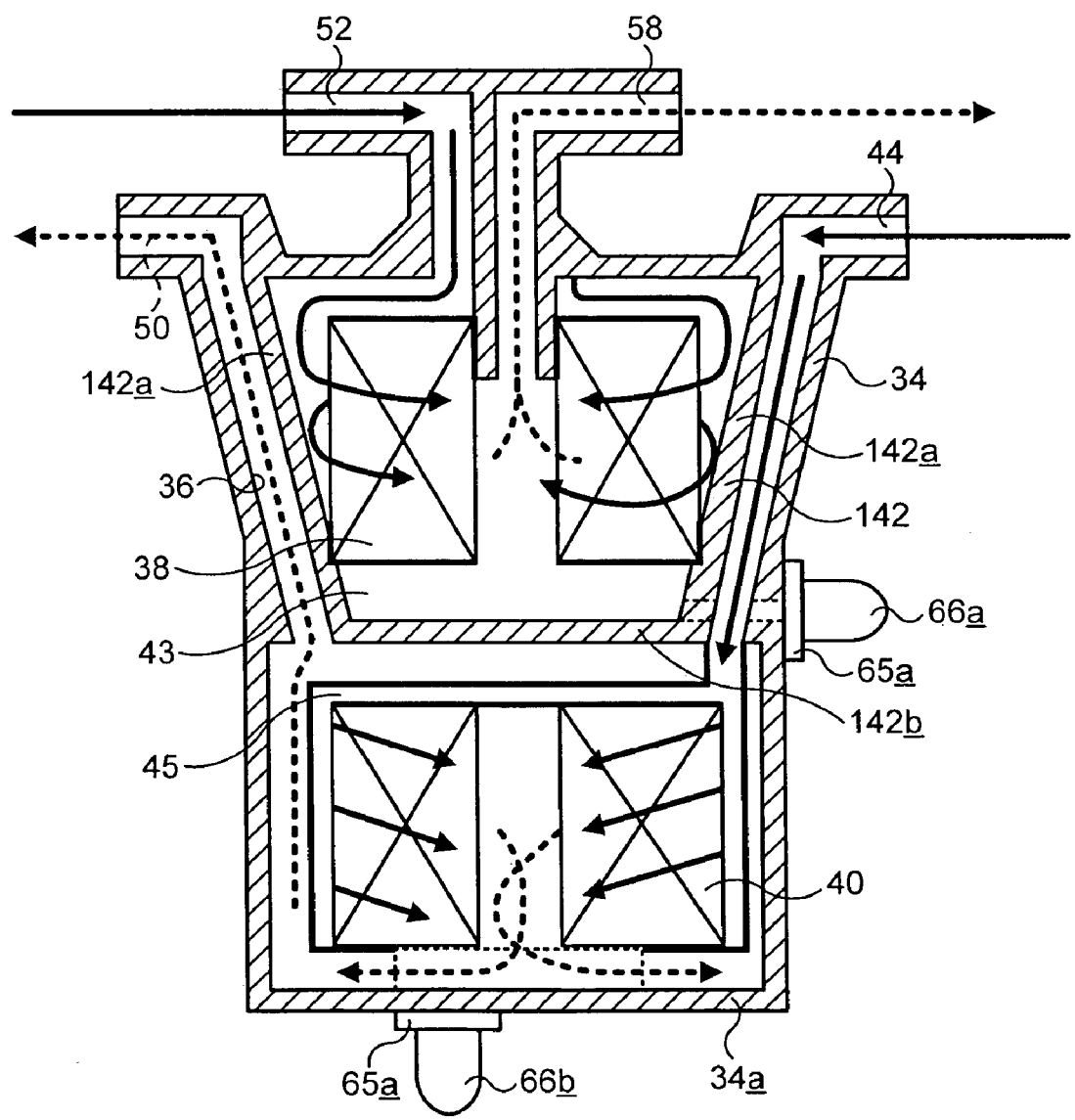
Figure 8:
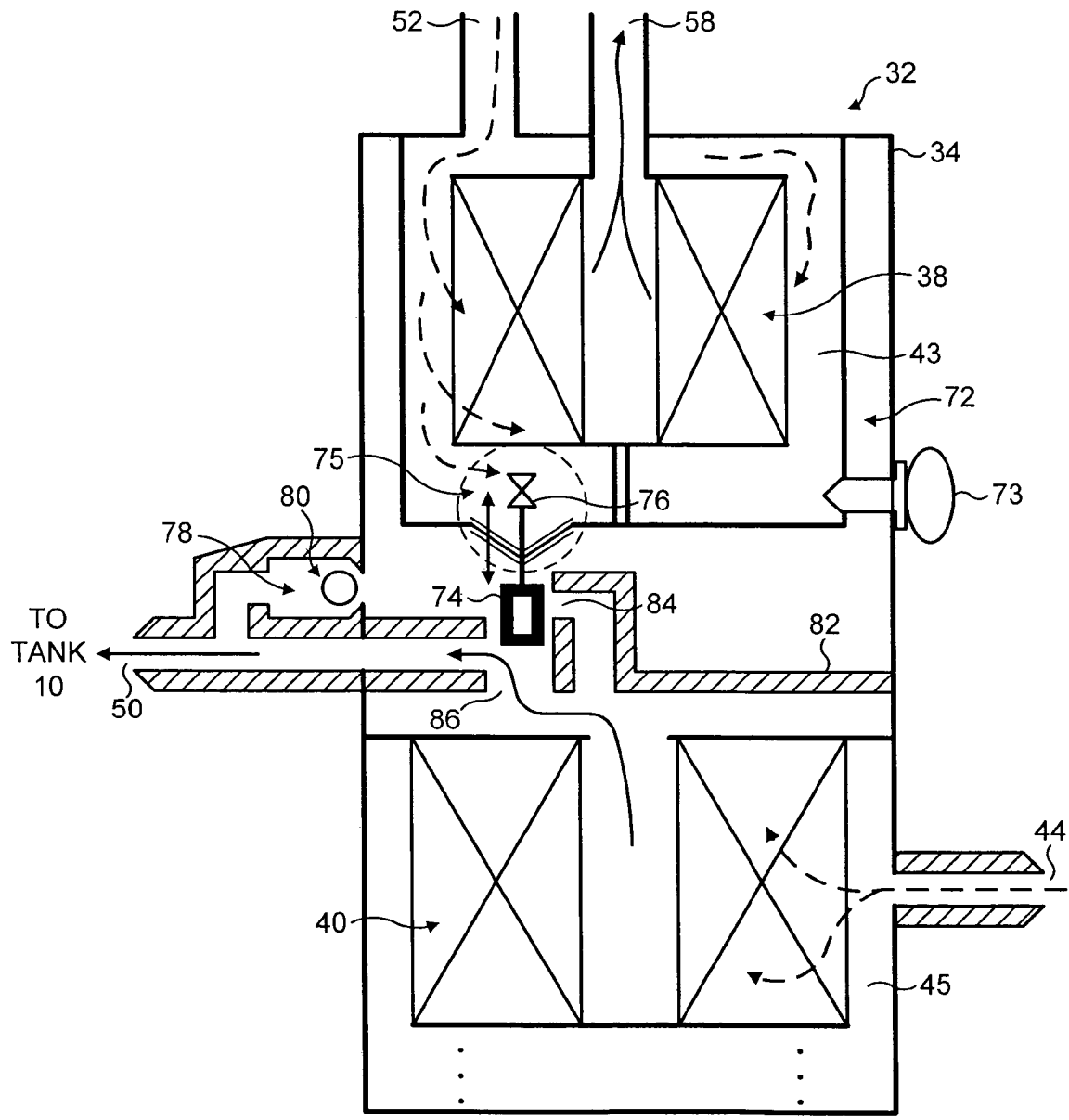
Figure 9:
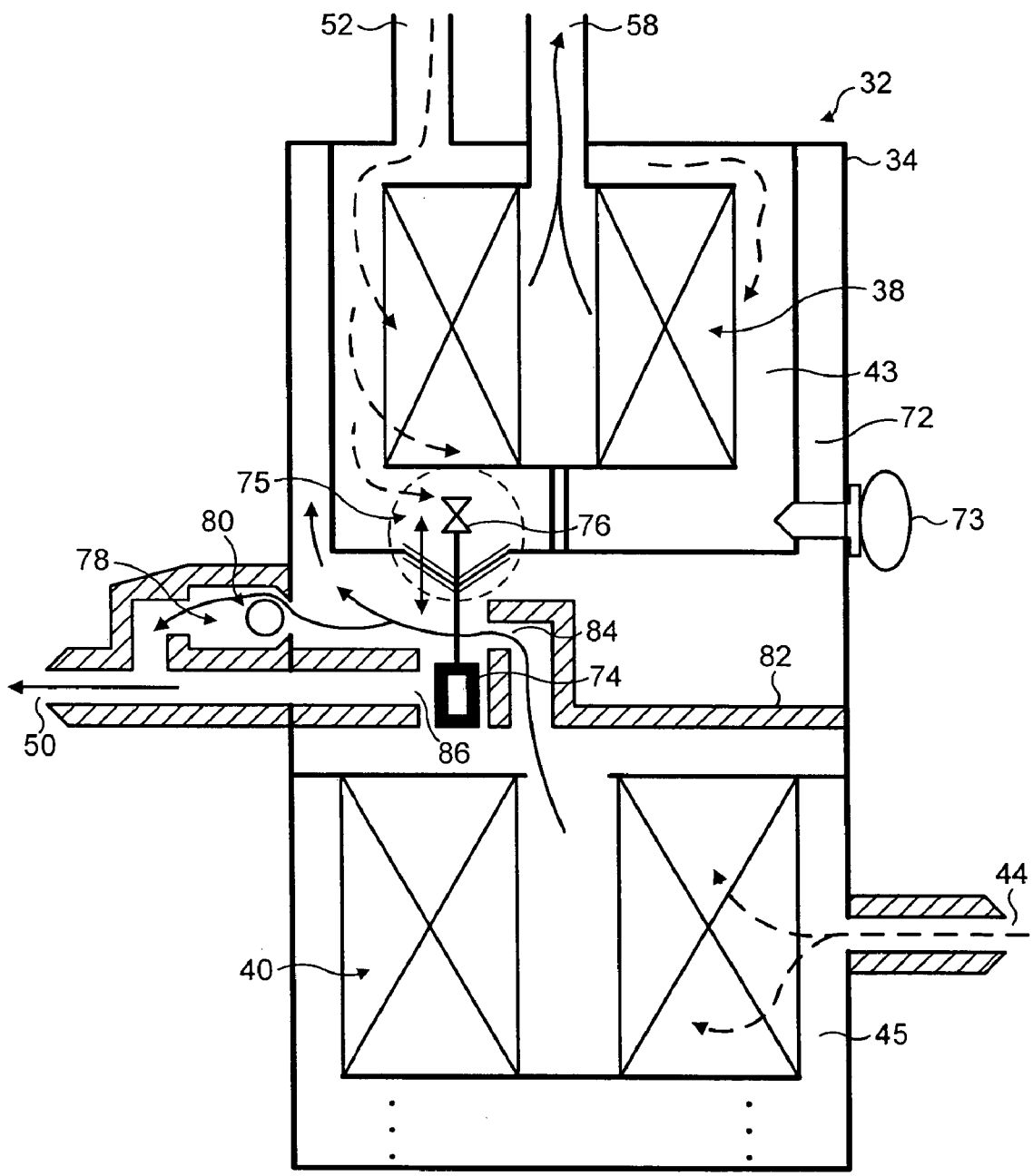
Figure 10:
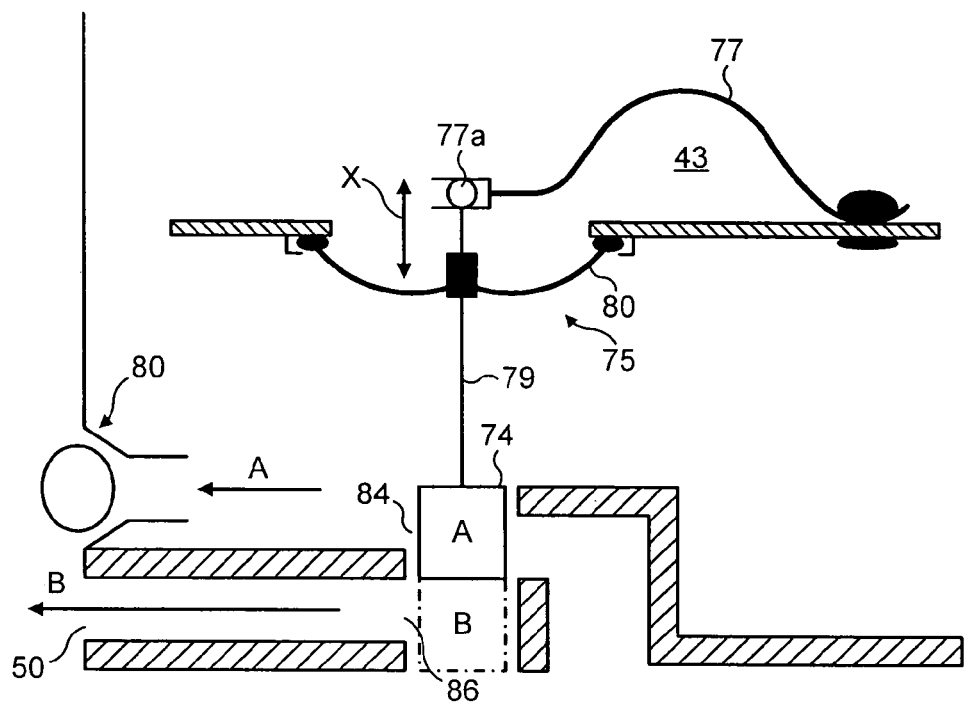
Figure 11:
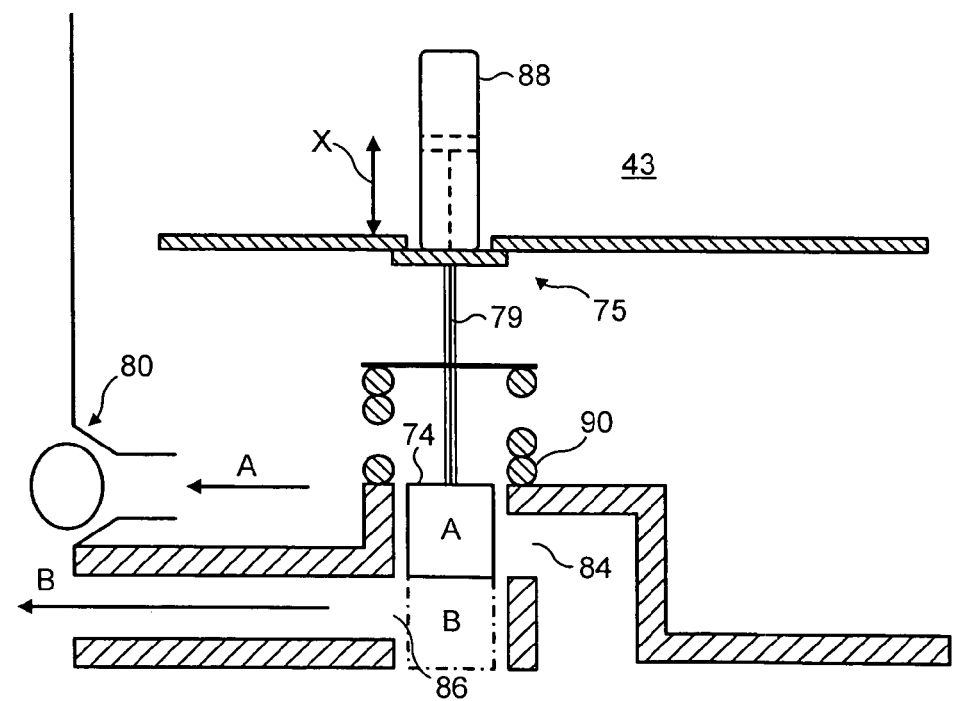
Figure 12:
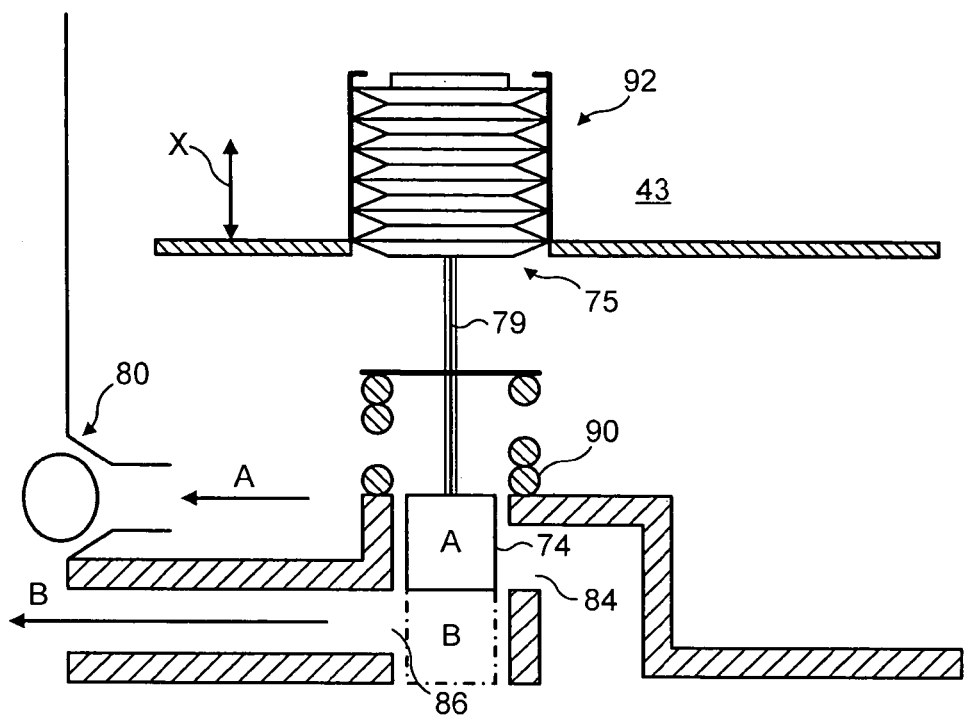
Figure 13:
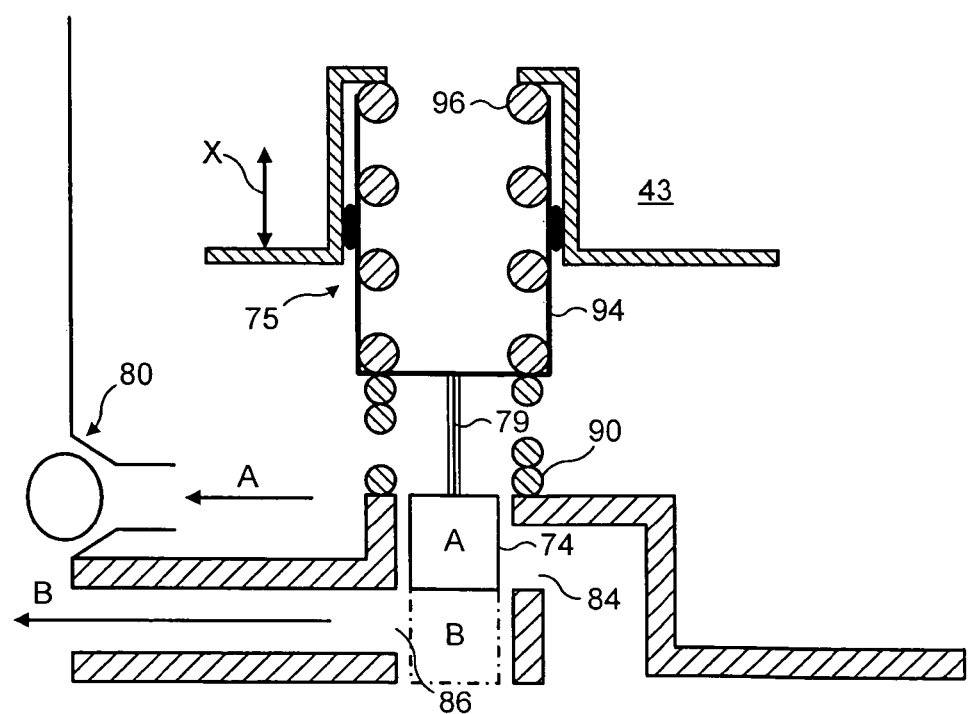

The invention will now be described, by way of example only, with reference to the accompanying drawings in which:

FIG. 1 is a schematic diagram of a fuel system for an internal combustion engine, including a primary filter for filtering a flow of fuel to fuel injection equipment, FIG. 2 is an alternative known fuel system to that shown in FIG. 1, and in which there is a positive return flow of fuel to a low pressure tank, FIG. 3 is a further alternative fuel system, similar to that shown in FIG. 2, incorporating a common rail, FIG. 4 is a fuel system in accordance with a first embodiment of the present invention, FIG. 5 is a fuel system in accordance with an alternative embodiment of the invention to that shown in FIG. 4, FIG. 6 is a schematic diagram of a filter arrangement for use in the fuel system in FIG. 4 or FIG. 5, FIG. 7 is a schematic diagram of an alternative filter arrangement to that shown in FIG. 6, for use in the fuel system in FIG. 4 or FIG. 5, FIG. 8 shows a schematic view of an alternative embodiment of the invention incorporating a heat exchange mechanism when in cold operating conditions, FIG. 9 is a schematic view of the filter in FIG. 8 when in hot operating conditions, FIG. 10 is a schematic view of an alternative embodiment when in hot (solid lines) and cold (dashed lines) operating conditions, and FIGS. 11 to 13 are views similar to that shown in FIG. 10 of alternative embodiments when in cold and hot operating conditions.

In fuel system design, the type of primary filter 14, such as that shown in FIGS. 1 to 3, which is used to filter the flow of fuel to the FIE 16 is selected by reference to a "Beta ratio", that is a measure of the number of particles per volume in the transmitted flow compared to the number of particles per volume in the inlet flow. For any given FIE 16, there is a maximum acceptable number of particles (for a given flow volume) which can be tolerated. For example, if a typical fuel cleanliness (unfiltered) is 100 particles/ml and the FIE 16 can tolerate a flow of 20 particles/ml, then it is necessary to provide a primary filter 14 having a Beta ratio of 5 (or higher). If, however, the fuel cleanliness (unfiltered) is worse than predicted, for example due to a positive return flow of fuel increasing the number of particles or other contaminants in the flow to the filter 14, the selected Beta ratio may be unsuitable to adequately protect the FIE 16. It will be appreciated that the reduced cleanliness of fuel passing through the primary filter 14 to the FIE 16 does not arise due to malfunctioning of the primary filter 14, but instead arises due to the increased quantity of debris and the like in the flow through the primary filter 14 due to the positive return flow of fuel through the return flow line 20.

Referring to FIG. 4, there is shown a fuel system in accordance with a first embodiment of the invention in which a low pressure flow of fuel from the tank 10 is delivered through a primary supply line 11 provided with a primary filter 14 to the FIE 16, as described previously. It will be appreciated that the FIE 16 may take any convenient form, for example it may include a single high pressure fuel pump for supplying fuel to a common rail which, in turn, delivers high pressure fuel to a plurality of injectors, or it may include a plurality of unit pump injectors, each comprising a high pressure pumping element and an injection nozzle and each of which supplies fuel to an associated engine cylinder. In this embodiment of the invention, a return flow of fuel from the FIE 16 is supplied through a return flow line 20 to the low pressure tank 10. The return flow line 20 located outside the tank 10 so as to space or separate the FIE 16 from the tank 10. It will be appreciated that the return flow of fuel through the return flow line 20 in FIG. 4 is represented as originating in the FIE 16, and that this return flow may comprise an injector back leak flow, and/or a positive return flow of fuel from a high pressure pumping element(s) of the fuel system and/or from a pressure regulator of the fuel system (if provided), as described with reference to FIGS. 2 and 3. In a positive return flow fuel system of the type described with reference to FIGS. 2 and 3, pumped fuel volume is typically in the range of 1200 ml/min to 1700 ml/min whereas injected fuel volume is typically in the range of 10 ml/min to 50 ml/min, dependent on engine load. Therefore, returned fuel volume is significantly greater than injected fuel volume.

The primary filter 14 forms part of a filter arrangement 32 which also includes a secondary filter 30 through which the return flow of fuel passes. The secondary filter 30 may be of a similar type to the primary filter 14 and serves to filter particulate contaminants or other debris within the return flow line 20, prior to the flow being returned to the tank 10.

Referring to FIG. 5, there is shown a preferred embodiment of the present invention in which the filter arrangement 32 includes both the primary filter 14 and the secondary filter 30 in a common housing 34. The fuel system in FIG. 5 is similar to that shown in FIG. 3, in that it takes the form of a common rail fuel system, including a high pressure pump 23 (optionally provided with a pressure regulator 26) for supplying high pressure fuel to a common rail 24 (optionally provided with a pressure regulator 28). The return flow line 20 receives the back leak flow 20*a* from the injectors 18, and receives a return flow 20*d* 20*e* from one or more of the pressure regulators 26, 28 respectively, if provided.

FIG. 6 is a schematic diagram of a filter arrangement 32 of the type shown in FIG. 5 in which the primary and secondary filter elements are housed within a common filter housing 34 comprising a lower, base portion 34*a* and an upper lid portion 34*b* in the form of a cover plate. The filter housing 34 is of tubular configuration and includes an inner wall 36 defining a filter chamber having primary and secondary filter chambers 43, 45 within which respective primary and secondary filter members 38, 40 are arranged. Each of the primary and secondary filter members 38, 40 typically takes the form of a tubular, pleated paper filter element which is substantially impermeable to contaminants and debris in the fuel flow but which permits clean fuel to flow therethrough.

The primary and secondary filter members 38, 40 are arranged coaxially with one another such that the primary filter member 40 is located within the primary filter member 38. The primary and secondary filter chambers 43, 45 are isolated from one another by means of a tubular dividing wall 42 forming part of the filter housing 34. The dividing wall 42 extends axially through the filter housing 34 between an internal surface of the upper lid portion 34*b* and an internal surface of the base portion 34*a* and serves to divide the filter chamber into the two isolated chambers 43, 45.

The primary and secondary filter members 38, 40 are mounted on a lower support plate 60 located within the filter chamber, an outer periphery of the support plate 60 being in fixed engagement with a surface of the inner wall 36 of the housing 34. The manner in which the primary filter member 38 is bonded or otherwise secured to the support plate 60 is such that fuel can only flow from an outer periphery of the primary filter member 38 (a dirty side of the filter) to an inner periphery of the filter member (a clean side of the filter) through the filter member 38 itself. The secondary filter member 40 is bonded or otherwise secured to the support plate 60 in a similar manner, and appropriate annular seal elements 61 are used to ensure a substantially fluid tight seal is provided between a lower end of each filter member 38, 40 and the support plate 60.

A primary inlet 52 on the dirty side of the primary filter receives fuel from the tank 10 through the supply line 11, and supplies an unfiltered flow of fuel to the primary filter chamber 43, as indicated by solid arrows 46. Fuel within the primary filter chamber 43 flows radially inwards through the primary filter member 38 which serves to filter contaminants and debris from the flow such that a clean, filtered flow of fuel, as indicated by dashed arrows 48, is delivered to a primary outlet 58 on the clean side of the primary filter. A filtered flow of fuel flows through the primary outlet 58 and is delivered to an inlet of the high pressure pump, such as the pump 23 in FIG. 5 or the high pressure pump means of the fuel injection equipment 16 in FIG. 4, for supply to the injectors of the fuel system.

Similarly, a secondary inlet 44 on the dirty side of the secondary filter receives fuel from the return flow line 20, and supplies fuel to the secondary filter chamber 45 (as indicated by solid arrows 54 to represent an unfiltered flow). Fuel within the secondary filter chamber 45 flows radially inwards through the secondary filter member 40 which serves to filter contaminants and debris from the return flow such that a clean, filtered flow of fuel (as indicated by dashed arrows 56) is delivered to a secondary outlet 50 from the filter arrangement 32 on the clean side of the secondary filter. Fuel delivered through the secondary outlet 58 continues through the return flow line 20 to the tank 10 for recirculation through the supply line 11.

The cover plate 34b of the filter housing 34 is arranged at an end of the housing 34 remote from the base portion 34a and is provided with openings through which the primary and secondary inlets 44, 52 and outlets 50, 58 extend. Conveniently, the filter housing 34 is provided with a suitable seal arrangement (not shown) to ensure fuel flow through the primary and secondary filter chambers 43, 45 is unable to leak from the housing 34. It will be appreciated that although the primary and secondary filter members 14, 30 are arranged within a common filter housing 34, in practice the housing 34 may consist of two or more housing parts which are sealingly secured together to form the common housing. Alternatively, the common housing 34 may be a unitary housing part.

A surface of the lower support plate 60 (on the underside of the plate in the orientation shown in FIG. 6) defines, together with the base portion 34a of the filter housing 34, a collection chamber 64. Water and other relatively dense contaminants tend to separate from the fuel flow through the filter arrangement 32 and flow in a downward direction through a plurality of openings (not shown) provided in the support plate 60 to permit such contaminants to flow into the collection chamber 64. Drain ports 65 are provided through which water within the collection chamber 64 can be drained, if required, at regular intervals throughout the service life of the filter arrangement 32, with appropriate plugs or seals 66 closing the drain ports 65 when the filter is in use.

The provision of the secondary filter in the return flow line 20 to the tank 10 provides the advantage that, even if relatively high volume positive return flows are returned through the return flow line 20, the effects of additional debris being returned to or generated within the tank 10, which may otherwise prejudice the service life of the primary filter, can be alleviated. Such prejudicial effects may arise, for example, as a result of increased return flow pipe lengths, debris generated in the fuel injection equipment and/or the pressure regulators of the fuel system and/or continual stirring of the tank contents due to high volumes of recirculated fuel.

By way of example, if both the primary filter 14 and the secondary filter 30 have a Beta ratio of 10 and if the applied contamination level of fuel within the tank 10 is 1000 particles/ml, the fuel flow through the primary filter gives rise to a fuel flow to the FIE 16 of 100 particles/ml. A flow of 100 particles/ml through the secondary filter 30 having a Beta ratio 10 results in a flow of 10 particles/ml. Typically, the FIE 16 can tolerate a flow of 20 particles/ml, such that a flow of 10 particles/ml is a satisfactory contamination level, even allowing for the effects of additional contamination by way of debris generated within the FIE and additional pipework.

A further advantage is obtained in that, should the effectiveness of the primary filter 14 be reduced, such that the number of contaminant particles and other debris transmitted through the primary filter member 38 is increased to an undesirably high level, the additional secondary filter member 40 provides at least some degree of filtering for the flow through the system.

In an alternative embodiment to that shown in FIG. 6, the flow direction through the primary and secondary filter members 38, 40 is radially outwards, in which case the primary filter member 38 is bonded or otherwise secured to the support plate 60 such that fuel can only flow from an inner periphery of the primary filter member 38 (a dirty side of the filter) to an outer periphery of the filter member (a clean side of the filter) through the filter member 38 itself. Similarly, flow through the secondary filter member 40 may be radially outwards, such that fuel can only flow from an inner periphery of the secondary filter member 38 (a dirty side of the filter) to an outer periphery of the filter member (a clean side of the filter) through the filter member 40 itself.

FIG. 7 shows an alternative embodiment of the invention, in which primary and secondary filter members 38, 40 of tubular form are arranged coaxially with one another in an end-to-end configuration, such that one end of the primary filter member 38 is located above (in the orientation shown) an end of the secondary filter member 40. The filter housing 34 includes a dividing wall 142 including a tubular regions 142a and a base region 142b. Opposing surfaces of the base region 142b define, in part, the primary and secondary filter chambers 43, 45 and a radially outward facing surface of the tubular region 142a defines, together with the adjacent region of the inner wall 36, a portion of the flow path between the secondary inlet 44 and the secondary outlet 50. Drain ports 65a and 65b are provided for the primary and secondary filter chambers 43, 45 respectively, each having an appropriate plug or seal 66a, 66b, as described previously.

As in the embodiment shown in FIG. 6, the primary inlet 52 on a dirty side of the primary filter receives fuel from the tank 10 through the supply line 11, and supplies an unfiltered flow of fuel to the primary filter chamber 43. Fuel flow into the primary filter chamber 43 flows radially inwards through the primary filter member 38 which serves to filter contaminants and debris from the flow, and a clean, filtered flow of fuel flows out through the primary outlet 58 on a clean side of the primary filter to the downstream high pressure pump.

Similarly, the secondary inlet 44 on a dirty side of the secondary filter receives fuel from the return flow line 20, and supplies fuel to the secondary filter chamber 45. Fuel flow into the secondary filter chamber 45 flows radially inwards through the secondary filter member 40 which serves to filter contaminants and debris from the return flow, and delivers a clean, filtered flow of fuel to the secondary outlet 50 and, hence, to the tank 10 for recirculation through the fuel system.

The embodiment of FIG. 7 provides similar advantages to those described previously in that the return flow of fuel is filtered prior to return to the tank 10 and, thus, the undesirable effects of any additional contamination of the high volume return flows through the system are alleviated. In addition, the return flow of fuel through the secondary filter 34 provides redundancy in the system in the event of failure or reduced effectiveness of the primary filter 14.

Additional advantages are provided if the primary filter 14 and the secondary filter 30 are incorporated within the same filter housing 34, as in FIG. 5. Firstly, less accommodation space is required within the engine for the primary and secondary filters 14, 30. Secondly, the return fuel flow through the secondary filter chamber 45 provides a means of heating the flow of fuel through the primary filter chamber 43. The temperature of fuel in the return line 20 is relatively high compared to that in the supply line 11 from the tank 10 and, thus, a heat exchange mechanism may be provided due to the proximity of the respective fuel flows through the primary and secondary filter chambers 43, 45. The heating effect provided by the return flow of fuel through the secondary filter chamber 45 may be used to augment that provided by a separate engine water jacket heater or electronic heater or, for some applications, may remove the need for a separate heater altogether. It is desirable to maintain fuel temperature above a predetermined amount to avoid the formation of wax crystals on the filter member 38 which otherwise has a detrimental effect on filter performance.

FIGS. 8 and 9 illustrate an embodiment of the invention in which a heat exchange mechanism is provided. The filter 32 is generally of the type shown in FIG. 7 in which primary and secondary filter members 38, 40 of tubular form are arranged coaxially with one another in an end-to-end configuration. The primary filter chamber 43 is arranged within a tubular heat exchange jacket 72 located within an upper region of the filter housing 34 and through which clean fuel from the secondary filter member 40 is able to circulate under certain operating conditions.

The filter 32 is provided with a temperature sensitive diverter valve arrangement 75 including a valve member 74 which is movable between a first position (as shown in FIG. 9) in which the return flow of fuel through the secondary filter member 40 is able to circulate through the heat exchange jacket 72 prior to return to the tank 10, and a second position (as shown in FIG. 8) in which the return flow of fuel flows directly to the outlet 50 from the secondary filter member 40. The temperature sensitive diverter valve 75 is therefore arranged to control whether the flow of fuel passing from the clean side of the secondary filter member 40 flows directly to the low pressure tank 10, or whether fuel is first circulated around the primary filter member 38 through the heat exchange jacket 72 before being returned to the tank 10.

The filter housing 34 has an intermediate dividing wall 82 which is shaped to define first and second ports 84, 86 respectively. The filter housing 34 is further shaped to define a diverted flow path 78 within which a spring biased ball of a non-return valve 80 is located, the diverted flow path 78 communicating, at its outlet end, with the secondary outlet 50. In its first position (FIG. 9), the valve member 74 closes the second port 86 such that the clean side of the secondary filter member 40 communicates with the secondary outlet 50 through the diverted flow path 78 and, hence, fuel flow from the clean side of the secondary filter 44 is circulated through the heat exchange jacket 72 prior to discharge through the diverted flow path 78 and the secondary outlet 50. In the second position (FIG. 8), the valve member 74 closes the first port 84 such that communication between the clean side of the secondary filter member 40 and the heat exchange jacket 72 is broken, and the clean side of the secondary filter member 40 communicates directly with the secondary outlet 50 through the second port 86. The valve member 74 is movable between its first and second positions under the influence of a temperature sensitive actuator arrangement, referred to generally as 75, including a temperature sensitive element 76.

FIGS. 10 to 13 show examples of the different types of temperature sensitive element 76 which may be employed. In FIG. 10 the temperature sensitive element takes the form of a bimetallic element or strip 77 carrying an end member 77a which is movable, along line X, between the first and second positions in dependence upon the temperature of fuel flowing through the primary filter chamber 43. The bimetallic strip 77 is coupled to the valve member 74 through an actuating rod 79 which extends through a diaphragm seal 80 located between the primary and secondary filter chambers 43, 45 to provide a substantially fluid tight seal therebetween. As an alternative, an O-ring seal or lip seal may be provided in place of the diaphragm seal 80.

The actuator arrangement 75 is configured such that the valve member 74 is caused to move from the second position (FIG. 8) to the first position (FIG. 9) if the temperature of fuel flow through the primary filter chamber 43 falls below a predetermined temperature at which wax crystallisation occurs on the primary filter member 38. In the operating condition in FIG. 8, the temperature of fuel flowing through the primary filter chamber 38 is above the predetermined temperature, and the bimetallic strip 77 is in a first state in which the valve member 74 closes the first port 84. The filtered return flow of fuel therefore flows directly from the clean side of the secondary filter member 40 to the secondary outlet 50 and, hence, to the tank 10. In the operating condition in FIG. 9, the temperature of fuel flowing through the primary filter chamber 43 is less than the predetermined temperature, and the bimetallic strip 77 is in a second state in which the valve member 74 closes the second port 86 and opens the first port 84. The filtered flow of return fuel is therefore able to circulate through the heat exchange jacket 72, prior to discharge through the diverted flow path 78 and the secondary outlet 50, and provides a heating effect for relatively low temperature fuel within the primary filter chamber 43 through heat exchange.

FIG. 11 shows an alternative embodiment in which the bimetallic strip is replaced with a wax element thermostat 88 coupled through an actuating rod 79 to the valve member 74 so as to provide an actuation force to the valve member 74. If the temperature of fuel flowing through the primary filter chamber 43 falls below the predetermined amount, the wax element thermostat 88 responds to cause movement of the valve member 74 between its first and second positions, thereby opening the first port 84 to permit higher temperature return fuel from the clean side of the secondary filter member 40 to circulate through the heat exchange jacket 72 prior to return to the tank 10. In this embodiment of the invention, the valve member 74 is provided with a return spring 90 which serves to urge the valve member 74 into the first position in which the second outlet 86 is closed.

FIG. 12 shows an embodiment similar to that shown in FIG. 11, but in which temperature sensitive bellows 92 are provided to provide the actuation force for the valve member 74. Optionally, a return spring 90 may be provided as in FIG. 11.

FIG. 13 shows a further alternative embodiment in which a Shape Memory Effect (SME) spring 96 is provided to actuate the valve member 74 depending on the temperature of fuel flowing through the primary filter chamber 43. The SME spring 96 acts on the valve member 74 through an intermediate member 94 coupled to the actuating rod 79. The SME spring 96 is arranged such that, in the event that the temperature within the primary filter chamber 43 falls below the predetermined amount, the valve member 74 is biased into the first position in which the return spring 90 is compressed and the first port 84 is closed, thereby causing fuel to circulate through the heat exchange jacket 72 prior to discharge through the diverted flow path 78 and the secondary outlet 50. If the temperature of fuel within the primary filter chamber 43 increases above the predetermined temperature, the SME spring 96 is compressed and the valve member 74 is urged into its second position (as shown in FIG. 8) under the force of the return spring 90 to open direct communication between the clean side of the secondary filter member 40 and the secondary outlet 50.

As an alternative to providing a linearly movable valve member 74 such as that shown in FIGS. 8 to 13, an angularly movable valve member may be provided to selectively open communication between the secondary filter and the port to the heat exchange jacket.

It will be appreciated that the filter in FIG. 6 may also be configured such that fuel flow through the secondary filter chamber 45 serves to provide a heating effect to fuel flow through the primary filter chamber 43, if desired, with an appropriate temperature sensitive valve arrangement being provided to divert the filtered return flow to heat fuel within the primary filter chamber 43 in the event that the temperature of fuel within the primary filter chamber 43 falls below a predetermined amount.

In a further alternative embodiment to that shown in FIGS. 8 and 9, the porting arrangement of the filter may be configured such that the return flow of fuel is circulated through the heat exchange jacket 72 prior to being passed through the secondary filter member 40 (i.e. the diverter valve arrangement is upstream of the secondary filter 34). In this case, the diverter valve arrangement is operable to divert the unfiltered return flow of fuel either directly to the secondary filter member 40, or via the heat exchange jacket 72 to the secondary filter member 40.

In practice, it is convenient if the primary and secondary filters 14, 30 have similar service lives for convenience of servicing. It would be understood by the skilled person that this would involve careful selection of the filter type, for example filter paper grade, the surface area of the filter members and Beta ratio.

In a further alternative embodiment of the invention to those shown, the primary and secondary filters may take the form of box-type filter elements.

The invention claimed is:

1. A fuel system for an internal combustion engine, the fuel system comprising:
   a fuel injection apparatus including at least one fuel injector, the fuel injection apparatus being arranged to inject fuel at high pressure into an associated combustion space;
   a primary supply line through which fuel is supplied from a low pressure reservoir (10) to the fuel injection apparatus;
   a return flow line for a return flow of fuel from the fuel injection apparatus to the low pressure reservoir;
   a filter arrangement including a primary filter arranged within the primary supply line for filtering contaminants from the flow of fuel through the primary supply line; and
   a secondary filter arranged within the return flow line for filtering contaminants from the flow of fuel through the return flow line, wherein the primary filter and the secondary filter are housed within a common filter housing.

2. A fuel system as claimed in claim 1, wherein the fuel injection apparatus includes a plurality of fuel injectors, the return flow line being arranged such that a return flow of fuel flows from the injectors, through the return flow line to the low pressure reservoir.

3. A fuel system as claimed in claim 1, further comprising a high pressure pump means arranged in the primary supply line to receive filtered fuel from the primary filter and to deliver fuel at high pressure to the fuel injection apparatus, and wherein the return flow line is arranged such that a return flow of fuel flows from the high pressure pump means, through the return flow line to the low pressure reservoir.

4. A fuel system as claimed in claim 1 for use with a compression-ignition internal combustion engine.

5. A fuel system as claimed in claim 3, wherein the fuel system takes the form of a common rail fuel system, comprising a common rail for receiving fuel at high pressure from the high pressure pump means and delivering fuel to the fuel injector(s).

6. A fuel system as claimed in claim 1, wherein the filter housing includes two or more housing parts secured together to form the common housing for the primary and secondary filter elements.

7. A fuel system as claimed in claim 1, wherein the filter arrangement includes a primary filter chamber within which a primary filter member is arranged and a secondary filter chamber within which a secondary filter member is arranged, wherein the primary and secondary filter members are substantially impermeable to contaminants within the fuel flow though the primary and secondary filter chambers respectively and wherein the primary and secondary filter chambers are substantially sealed from one another.

8. A fuel system as claimed in claim 7, wherein the primary and secondary filter members are of tubular form and are arranged coaxially with one another in an end-to-end configuration such that one end of the primary filter member faces one end of the secondary filter member.

9. A fuel system as claimed in claim 7, wherein the primary and secondary filter members are located within respective primary and secondary filter chambers arranged adjacent to one another.

10. A fuel system as claimed in claim 7, further comprising a diverter flow path through which the return flow of fuel flows, in use, when fuel temperature within the primary filter chamber is less than a predetermined amount, and a diverter valve arrangement for controlling the flow of fuel through the diverter flow path in response to fuel temperature within the primary filter chamber.

11. A fuel system as claimed in claim 10, wherein the diverter valve arrangement is a temperature sensitive valve arrangement.

12. A fuel system as claimed in claim 11, wherein the temperature sensitive valve arrangement is a bimetallic element arranged to act on a valve member, the valve member being movable under a force due to the spring between a first position in which the diverter flow path is open to permit a diverted flow of return fuel to circulate around the primary filter chamber prior to return to the tank and a second position in which the diverter flow path is closed.

13. A fuel system as claimed in claim 12, wherein the diverter flow path is downstream of the secondary filter.

14. A filter arrangement for a fuel system for an internal combustion engine, the filter arrangement comprising:
   a filter housing;
   a primary filter chamber defined by the filter housing and having a primary filter member arranged therein for filtering a primary fuel flow;
   and a secondary filter chamber defined by the filter housing and having a secondary filter member arranged therein for filtering a secondary fuel flow, wherein the primary and secondary filter chambers are substantially sealed from one another.

15. A filter arrangement as claimed in claim 14, wherein the filter housing includes two or more housing parts secured together to form the filter housing for the primary and secondary filter members.

16. A filter arrangement as claimed in claim 14, wherein the primary and secondary filter members are substantially impermeable to contaminants within the fuel flow through the primary and secondary filter chambers respectively.

17. A filter arrangement as claimed in claim 16, wherein the primary and secondary filter members are of tubular form and are arranged coaxially with one another in an end-to-end configuration in which one end of the primary filter member faces one end of the secondary filter member.

18. A filter arrangement as claimed in claim 16, wherein the primary and secondary filter members are located within respective primary and secondary filter chambers (43), (45) arranged adjacent to one another.

19. A filter arrangement as claimed in claim 14, further comprising a diverted flow path through which the return flow of fuel flows, in use, when fuel temperature within the primary filter chamber is less than a predetermined amount, and a valve arrangement for controlling the flow of fuel through the diverted flow path in response to fuel temperature within the primary filter chamber.

20. A fuel system as claimed in claim 19, wherein the valve arrangement includes a temperature sensitive actuator arrangement for actuating movement of a valve member to selectively open communication between the secondary filter chamber and the diverted flow path in response to fuel temperature within the primary filter chamber, wherein the temperature sensitive actuator arrangement includes any one of a bimetallic element, a Shape Memory Effect spring, a wax element thermostat or temperature sensitive bellows.

* * * * *